(12) United States Patent
Liu et al.

(10) Patent No.: US 7,197,053 B1
(45) Date of Patent: Mar. 27, 2007

(54) SERIALIZER WITH PROGRAMMABLE DELAY ELEMENTS

(75) Inventors: Zhixiang Jason Liu, San Diego, CA (US); Thomas Clark Bryan, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 980 days.

(21) Appl. No.: 10/382,954

(22) Filed: Mar. 5, 2003

(51) Int. Cl.
*H04J 3/06* (2006.01)

(52) U.S. Cl. ...................................... 370/503; 375/376
(58) Field of Classification Search ................ 370/503; 375/375
See application file for complete search history.

(56) References Cited

U.S. PATENT DOCUMENTS

| | | | | |
|---|---|---|---|---|
| 4,445,215 A | * | 4/1984 | Svendsen | 370/517 |
| 4,532,557 A | * | 7/1985 | Larkins | 386/65 |
| 4,535,459 A | * | 8/1985 | Hogge, Jr. | 375/324 |
| 5,027,085 A | * | 6/1991 | DeVito | 331/1 A |
| 5,319,369 A | * | 6/1994 | Majos et al. | 341/101 |
| 5,650,954 A | * | 7/1997 | Minuhin | 708/819 |
| 5,712,876 A | * | 1/1998 | Yoshizawa et al. | 375/268 |
| 5,920,600 A | * | 7/1999 | Yamaoka et al. | 375/376 |
| 6,259,755 B1 | * | 7/2001 | O'Sullivan et al. | 375/376 |
| 6,266,799 B1 | * | 7/2001 | Lee et al. | 716/6 |
| 6,741,668 B1 | * | 5/2004 | Nakamura | 375/376 |

* cited by examiner

*Primary Examiner*—Doris H. To
*Assistant Examiner*—Phuongchau Ba Nguyen
(74) *Attorney, Agent, or Firm*—Incaplaw; Terrance A. Meador

(57) ABSTRACT

A two-bit serializer circuit as described herein includes programmable delay elements having adjustable phase delay that allows for phase tuning of two parallel input signals relative to an output multiplexer select signal. The two parallel input signals are retimed relative to a reference clock signal, and one of the retimed signals is processed by a fixed delay element. This delayed intermediate signal is further delayed using one programmable delay element; the other retimed signal is delayed using another programmable delay element. The delayed output signals generated by the programmable delay elements are utilized as input signals to a high speed output multiplexer. The multiplexer output select signal represents a buffered version of the reference clock signal. The programmable nature of the serializer circuit facilitates tuning to reduce jitter in the serialized output signal.

20 Claims, 3 Drawing Sheets

SERIALIZER WITH PROGRAMMABLE DELAY ELEMENTS

FIELD OF THE INVENTION

The present invention relates generally to digital circuits. More particularly, the present invention relates to a serializer circuit for generating a serial digital output signal from two parallel digital input signals.

BACKGROUND OF THE INVENTION

A two-bit serializer transforms two parallel digital input signals into one serial digital output signal. The serializer output represents the data from the first input signal interleaved with the data from the second input signal. In other words, the data from the two input signals alternates in the output signal. The bit rate of each input signal is half the bit rate of the output signal.

A two-bit serializer is a key component in the transmitter for a synchronous optical network ("SONET") application. The output data rate of the serializer in such an application can reach 10 Gbps. The amount of data pattern jitter must be maintained at acceptable levels in practical applications to ensure proper transmission of the intended data. Conventional high speed two-bit serializers, however, suffer from relatively high amounts of data pattern jitter caused by input signal switching noise present in the output signal. Accordingly, a need exists for a high speed two-bit serializer having low data pattern jitter characteristics.

BRIEF SUMMARY OF THE INVENTION

A two-bit serializer configured in accordance with the invention is suitable for use in high speed SONET applications that require an output data rate of up to 10 Gbps. The serializer includes digitally programmable delay elements that introduce an adjustable amount of delay to the two input signal data patterns. The programmable delay elements facilitate proper timing alignment of the two input data patterns with respect to the output selection timing.

BRIEF DESCRIPTION OF THE DRAWINGS

A more complete understanding of the present invention may be derived by referring to the detailed description and claims when considered in conjunction with the following Figures, wherein like reference numbers refer to similar elements throughout the Figures.

DETAILED DESCRIPTION OF A PREFERRED EMBODIMENT

The present invention may be described herein in terms of functional block components and various processing steps. It should be appreciated that such functional blocks may be realized by any number of hardware, software, and/or firmware components configured to perform the specified functions. For example, the present invention may employ various integrated circuit components, logic elements, clock elements, and the like, which may carry out a variety of functions under the control of one or more microprocessors or other control devices. In addition, those skilled in the art will appreciate that the present invention may be practiced in conjunction with any number of practical applications and protocols and that the system described herein is merely one exemplary application for the invention.

It should be appreciated that the particular implementations shown and described herein are illustrative of the invention and its best mode and are not intended to otherwise limit the scope of the invention in any way. Indeed, for the sake of brevity, conventional aspects of the circuits (and the individual operating components of the circuits) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical embodiment.

The following description refers to nodes or features being "connected" or "coupled" together. As used herein, unless expressly stated otherwise, "connected" means that one node/feature is directly or indirectly connected to another node/feature, and not necessarily mechanically. Likewise, unless expressly stated otherwise, "coupled" means that one node/feature is directly or indirectly coupled to another node/feature, and not necessarily mechanically. Thus, although the schematic representations shown in FIGS. 1 and 2 depict certain example arrangements of elements, additional intervening elements, devices, features, or components may be present in an actual embodiment (assuming that the functionality of the circuit is not adversely affected).

Figure 1:
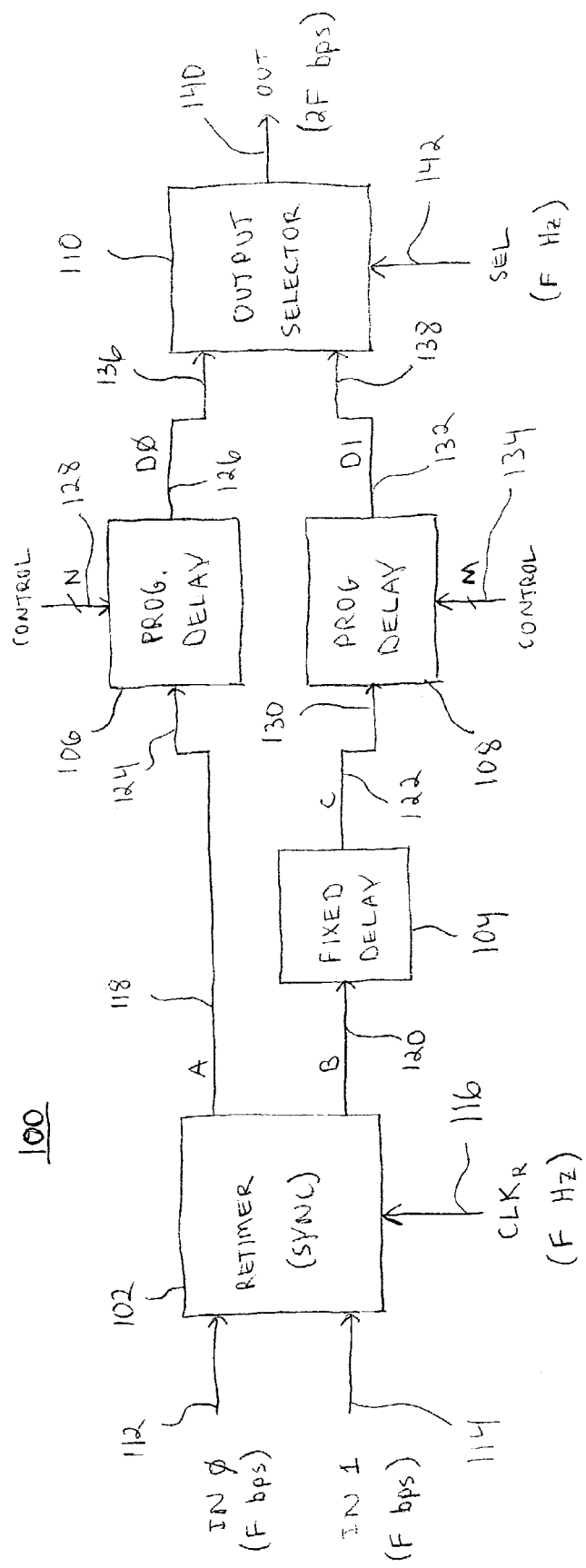
FIG. 1 is a schematic representation of a serializer circuit configured in accordance with the invention.
Figure 2:
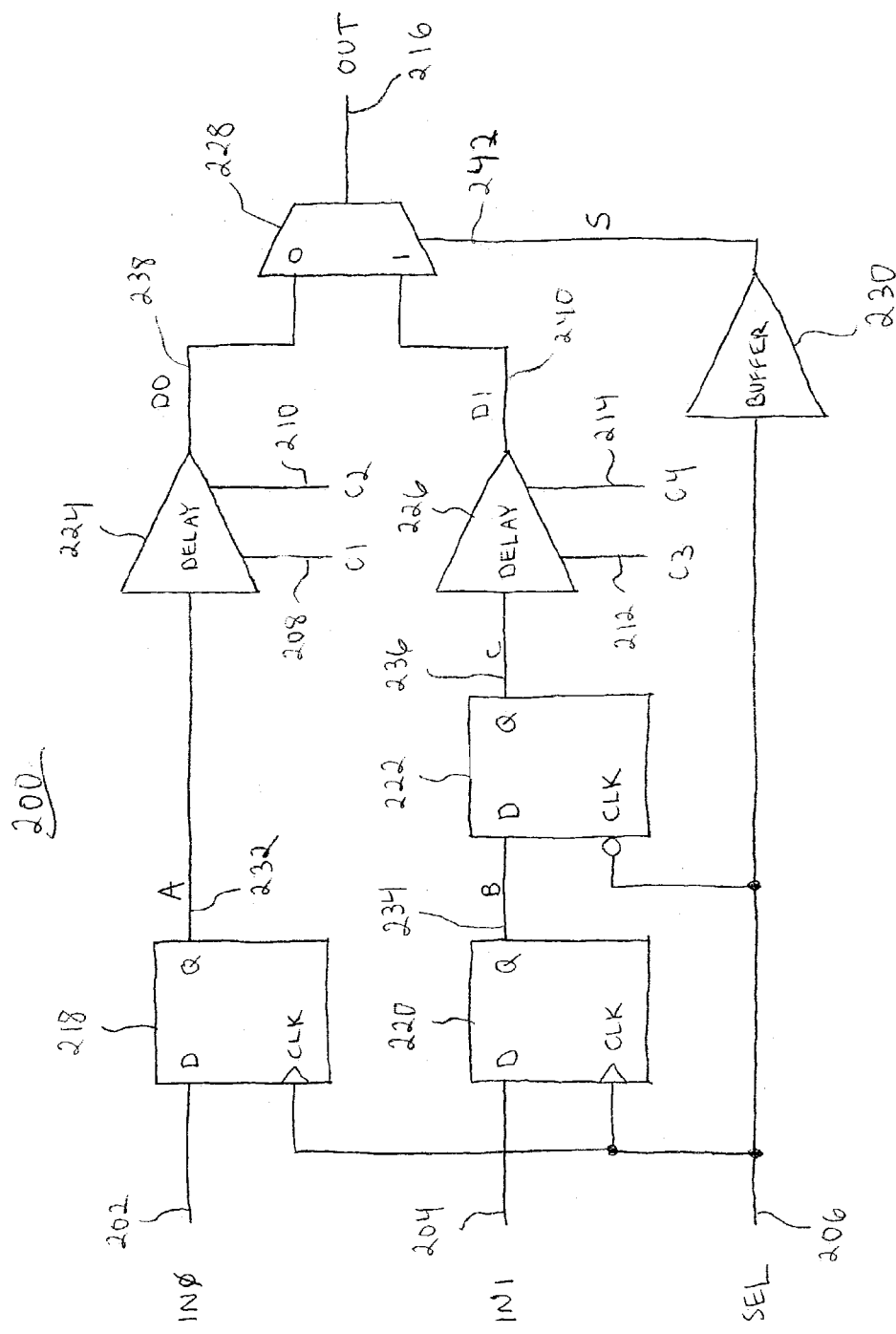
FIG. 2 is a schematic representation of an example implementation of the serializer circuit of FIG. 1.

FIG. 1 is a general schematic representation of a serializer circuit 100 that transforms two parallel data streams into one serial data stream. Serializer circuit 100 generally includes an input signal retimer 102, a fixed delay element 104, a first programmable delay element 106, a second programmable delay element 108, and an output signal selector 110. Serializer circuit 100 can be suitably modified to accommodate more than two parallel input signals such that the serialized output data signal represents data taken from more than two input streams.

Retimer 102 includes an input for receiving a first initial input data signal 112 (labeled IN0) and an input for receiving a second initial input data signal 114 (labeled IN1). The first and second initial input data signals 112/114 each convey digital data at the same bit rate of F bits/second. In a practical embodiment, this rate is 5 Gbps. Ideally, the first and second initial input data signals 112/114 are aligned with one another, i.e., the timing of the bit transition points are synchronized. In practical embodiments, however, there may be a phase offset between the two initial input data signals 112/114. Retimer 102 is suitably configured to retime or synchronize the first and second initial input data signals 112/114 relative to a reference clock signal 116 received by retimer 102. The reference clock signal 116 (labeled $CLK_R$) has a frequency of F cycles/second, and retimer 102 generates a first aligned data signal 118 (labeled A) from the first initial input data signal 112, and a second aligned data signal 120 (labeled B) from the second initial input data signal 114. Retimer 102 synchronizes the first and second aligned data signals 118/120 such that their respective bit transition points are aligned.

Figure 3:
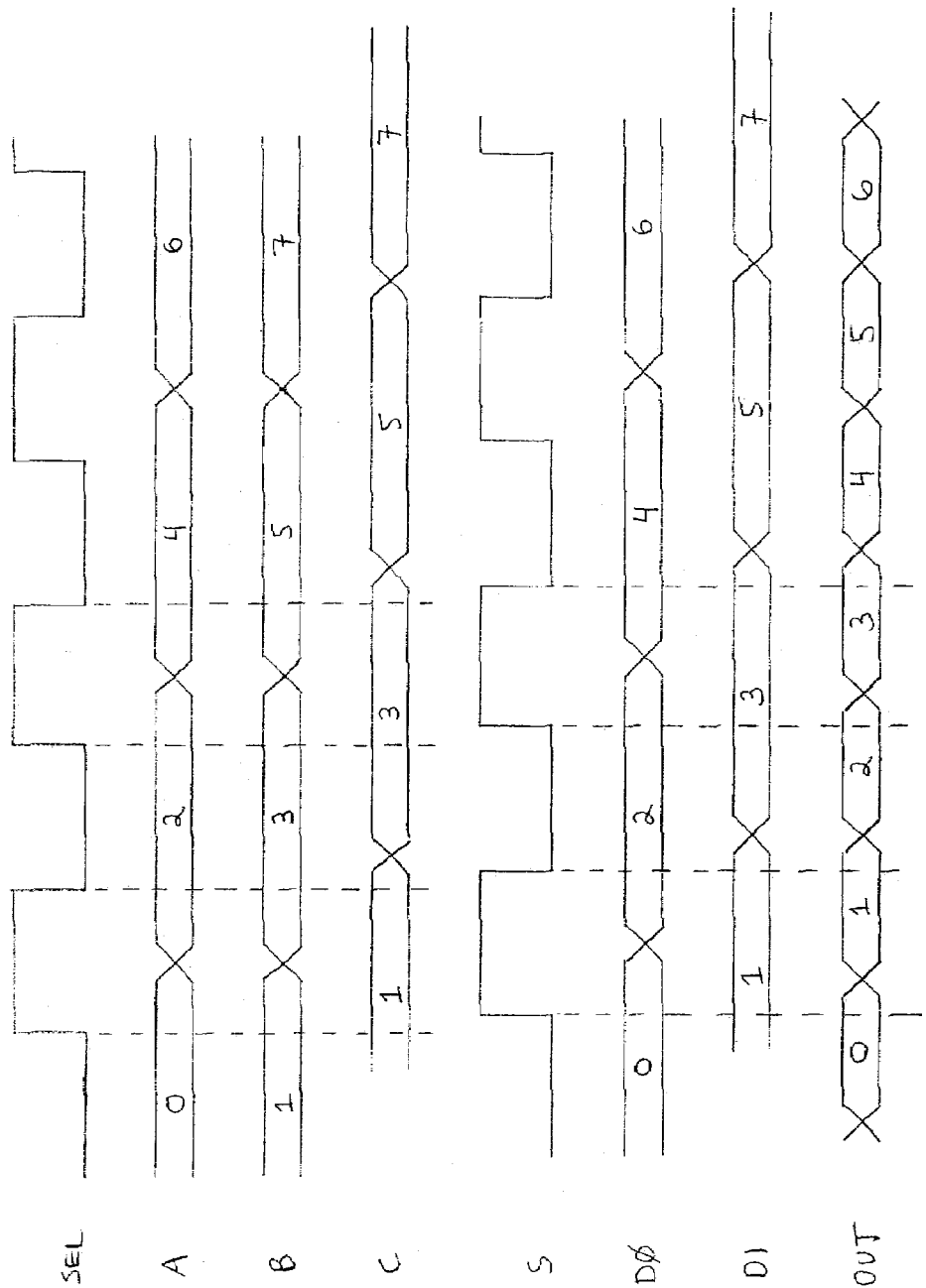
FIG. 3 is a timing diagram that illustrates the processing of example data patterns by the serializer circuit of FIG. 1.

Fixed delay element 104 includes an input for receiving an intermediate data signal that is based on second aligned data signal 120. In the example embodiment, the intermediate data signal corresponds to second aligned data signal 120. Fixed delay element 104 is configured to delay its input data signal by a fixed delay amount, and to generate a delayed intermediate data signal 122 (labeled C) at its output. In this regard, the delayed intermediate data signal represents the intermediate data signal (the second aligned data signal 120 in this example) delayed by the fixed delay amount. In the practical embodiment, the fixed delay amount is equal to one-half the period of the reference clock signal 116; this delay creates a specific offset between the bit transition points of the first aligned data signal 118 and the bit transition points of the delayed intermediate data signal 122. FIG. 3 is an example timing diagram that illustrates this timing offset.

First programmable delay element 106 includes an input for a first input data signal 124, an output for a first delayed data signal 126, and at least one control input for a first number of control signals 128. In the example embodiment, an output of retimer 102 is directly connected to the input of first programmable delay element 106, and first input data signal 124 corresponds to first aligned data signal 118. In the preferred embodiment, first programmable delay element 106 includes N control inputs to accommodate N digital control signals 128. The control signals 128 are utilized to program first programmable delay element 106 to provide a first delay amount. In this regard, the first delayed data signal 126 represents the first input data signal 124 delayed by the first delay amount, which is determined by the first number of control signals 128. The specific amount of the first delay may vary from application to application, and first programmable delay element 106 can be configured to support any number of different delay amounts.

Second programmable delay element 108 includes an input for a second input data signal 130, an output for a second delayed data signal 132, and at least one control input for a second number of control signals 134. In the example embodiment, the output of fixed delay element 104 is directly connected to the input of second programmable delay element 108, and second input data signal 130 corresponds to delayed intermediate data signal 122. In the preferred embodiment, second programmable delay element 108 includes M control inputs to accommodate M digital control signals 134 (in practice, N may, but need not, be equal to M). The control signals 134 are utilized to program second programmable delay element 108 to provide a second delay amount. In this regard, the second delayed data signal 132 represents the delayed intermediate data signal 122 delayed by the second delay amount, which is determined by the second number of control signals 134. The specific amount of the second delay may vary from application to application, and second programmable delay element 108 can be configured to support any number of different delay amounts.

Output signal selector 110 includes one input for a first selectable signal 136 (labeled D0), another input for a second selectable signal 138 (labeled D1), an output for a serialized output signal 140, and at least one input for one or more select signals 142 (labeled SEL). In accordance with the illustrated embodiment, the output of first programmable delay element 106 is directly connected to the first input of output signal selector 110, and the output of second programmable delay element 108 is directly connected to the second input of output signal selector 110. Consequently, in this embodiment, the first selectable signal 136 corresponds to the first delayed data signal 126, and the second selectable signal 138 corresponds to the second delayed data signal 132.

Output signal selector 110 is suitably configured to select, in response to select signal 142, the first selectable signal 136 or the second selectable signal 138 for use as the serialized output signal 140. In the practical embodiment, select signal 142 is derived from reference clock signal 116; select signal 142 also has a frequency of F cycles/second. Select signal 142 causes output signal selector 110 to switch between the first and second selectable signals 136/138 and to "sample" those signals to generate the serialized output signal 140. The serialized output signal 140 conveys data at a rate of 2F bits/second, and the bits originally contained in the first and second initial input data signals 112/114 alternate in the serialized output signal 140 (see FIG. 3 for a visual depiction).

FIG. 2 is a schematic representation of an example serializer circuit 200, which represents one practical realization of serializer circuit 100. Serializer circuit 200 receives a first initial input data signal 202 (labeled IN0), a second initial input data signal 204 (labeled IN1), a reference clock signal 206 (labeled SEL), and a number of digital control signals 208/210/212/214 (respectively labeled C1, C2, C3, and C4). In response to these inputs, serializer circuit 200 generates a serialized output signal 216 that conveys the data contained in the first and second initial input data signals 202/204. Serializer circuit 200 generally includes a first flip-flop circuit 218, a second flip-flop circuit 220, a latch circuit 222, a first programmable delay element 224, a second programmable delay element 226, a multiplexer 228, and a buffer element 230.

First flip-flop circuit 218, which is a D flip-flop in the example embodiment, includes a data input for the first initial input data signal 202, a clock input for the reference clock signal 206, and a data output. Flip-flop circuit 218 operates in a conventional manner to retime the first initial input data signal 202. Briefly, flip-flop circuit 218 samples the data present at its data input at each rising edge of the reference clock signal 206; this sampled data value is held at the data output until the next rising edge of the reference clock signal 206, when the first initial input data signal 202 is sampled again. In this manner, the first initial input data signal 202 is retimed, in response to (and relative to) the reference clock signal 206, to produce a first aligned data signal 232. As described above in connection with serializer circuit 100, the first initial input data signal 202 conveys digital data at a bit rate of F bits/second, and the reference clock signal has a frequency of F cycles/second.

Second flip-flop circuit 220, which is a D flip-flop in the example embodiment, includes a data input for the second initial input data signal 204, a clock input for the reference clock signal 206, and a data output. Flip-flop circuit 220 operates in a conventional manner to retime the second initial input data signal 204. In the manner described above for first flip-flop circuit 218, the second initial input data signal 204 is retimed, in response to (and relative to) the reference clock signal 206, to produce a second aligned data signal 234. The second initial input data signal 204 also conveys digital data at a bit rate of F bits/second.

The combination of first and second flip-flop circuits 218/220 is one example implementation of an input signal retimer, such as retimer 102. First and second flip-flop circuits 218/220 align the bit transition points of the first aligned data signal 232 with the bit transition points of the second aligned data signal 234, as shown in FIG. 3 (where A represents the first aligned data signal 232 and B represents the second aligned data signal 234).

Latch circuit 222 includes a data input connected to the data output of second flip-flop circuit 220, a clock input, and a data output. In the example embodiment, latch circuit 222 is directly connected to second flip-flop circuit 220, and second aligned data signal 234 serves as the data input to latch circuit 222. As shown in FIG. 2, latch circuit 222 receives reference clock signal 206 at the clock input, and utilizes the inverse of reference clock signal 206 as a gate signal. Latch circuit 222 operates in a conventional manner, which results in a phase shifting of second aligned data signal 234. Briefly, when reference clock signal 206 is in a logic low state, the data at the output of latch circuit 222 follows the data at the input of latch circuit 222. When reference clock signal 206 is in a logic high state, the data present at the input of latch circuit 222 prior to the low-to-high transition is maintained at the output of latch circuit 222. In the example embodiment, where the frequency of reference clock signal 206 (in cycles/second) equals the data rate of the second aligned data signal 234 (in bits/second), latch circuit 222 effectively delays the second aligned data signal 234 by one-half of the period of the reference clock signal 206. If the frequency of the reference clock signal is F cycles/second, then the delay introduced by latch circuit 222 is equal to $$\frac{1}{2F}$$

seconds. The output of latch circuit 222 is a delayed intermediate data signal 236 (labeled C) that represents the second aligned data signal delayed by the latch delay amount. The delay introduced by latch circuit 222 is depicted in FIG. 3 as the phase difference between the B and C signals. Notably, the delayed intermediate data signal 236 is also delayed relative to the first aligned data signal 232. Latch circuit 222 is one example implementation of a fixed delay element, such as the fixed delay element 104 of FIG. 1.

First programmable delay element 224 has an input connected to the output of first flip-flop circuit 218, an output, and two control signal inputs for control signals 208/210. First programmable delay element 224 is configured to provide an adjustable/selectable delay that is determined by digital control signals 208/210. In this regard, first programmable delay element 224 may have up to four programmable delay values corresponding to the four different binary combinations of control signals 208/210. The specific amounts of delay are dependent upon the particular application. First programmable delay element 224 generates a first delayed data signal 238 (labeled D0), which represents the first aligned data signal 232 delayed by the adjustable delay amount selected by the control signals 208/210. The phase relationship between the first aligned data signal 232 and the first delayed data signal 238 is depicted in FIG. 3.

Second programmable delay element 226 has an input connected to the output of latch circuit 222, an output, and two control signal inputs for control signals 212/214. Second programmable delay element 226 is configured to provide an adjustable/selectable delay that is determined by digital control signals 212/214. In this regard, second programmable delay element 226 may have up to four programmable delay values corresponding to the four different binary combinations of control signals 212/214. The specific amounts of delay are dependent upon the particular application. Second programmable delay element 226 generates a second delayed data signal 240 (labeled D1), which represents the delayed intermediate data signal 236 further delayed by the adjustable delay amount selected by the control signals 212/214. The phase relationship between the delayed intermediate data signal 236 and the second delayed data signal 240 is depicted in FIG. 3.

In accordance with one practical embodiment, first and second programmable delay elements 224/226 are identical in design, and their respective control signals are set such that they introduce the same amount of delay to their respective input signals. In other words, control signal 208 and control signal 212 are common signals, and control signal 210 and control signal 214 are common signals. The adjustable nature of first and second programmable delay elements 224/226 facilitates the "tuning" of serializer circuit 200 to compensate for manufacturing process variations and/or to enable serializer circuit 200 to accommodate different application requirements. In this regard, the control signals for a programmable delay element can be set during diagnostic testing and need not be readjusted after deployment of serializer circuit. Alternatively, the control signals may be dynamically adjusted as necessary by other components, logic, or processes resident at the system or subsystem level (not shown herein).

Multiplexer 228 is configured to receive first delayed data signal 238 as one data input, and second delayed data signal 240 as another data input. Multiplexer 228 functions in a conventional manner to select first delayed data signal 238 or second delayed data signal 240 for use as the serialized output signal 216 in response to a select signal 242. In the example embodiment, only one select signal 242 is necessary because multiplexer 228 need only select from two input signals. When select signal 242 is in a logic high state, multiplexer 228 selects second delayed data signal 240 for generation of the serialized output signal 216; when select signal 242 is in a logic low state, multiplexer 228 selects first delayed data signal 238 for generation of the serialized output signal 216. In the preferred embodiment, select signal 242 has a frequency of F cycles/second. Consequently, the resulting serialized output signal 216 has a data rate of 2F bits/second.

Buffer element 230 has an input for receiving reference clock signal 206 and an output for producing select signal 242 in response to reference clock signal 206. Buffer element 230 is utilized in practical embodiments to improve the waveform shape of select signal 242; buffer element 230 "sharpens" the transitions of reference clock signal 206 to improve the timing of multiplexer 228. Buffer element 230, however, adds a small amount of phase delay (due to the analog realization of buffer element 230), which delays select signal 242 slightly relative to reference clock signal 206. This characteristic is depicted in FIG. 3 as the phase offset between the SEL signal and the S signal. The programmable delay elements 224/226 are utilized to compensate for this inherent delay in the select signal 242. In this respect, the programmable delay amounts respectively adjust the timing of the first delayed data signal 238 and the second delayed data signal 240, relative to select signal 242, and such that transitions of select signal 242 occur at times when the bit state of data in the first and second delayed data signals 238/240 is settled. This timing characteristic, which is depicted in FIG. 3, reduces jitter in serialized output signal 216. As shown in FIG. 3, select signal 242 is high only during times when the data in the D1 signal is well settled.

Similarly, select signal 242 is low only during times when the data in the D0 signal is well settled.

A serializer circuit as described above can be employed in a number of practical applications to transform a two-bit parallel input data stream into a serial data stream. FIG. 3 is a diagram 300 that illustrates the timing relationship between example data patterns handled by a serializer circuit such as that shown in FIG. 1. Time increases going from left to right in FIG. 3. In operation, the serializer circuit receives the first and second parallel input data signals, each conveying data at the same bit rate. These two input data signals are then synchronized with a retimer circuit to obtain respective aligned data signals (the aligned data signals are labeled signal A and signal B in FIG. 3). For ease of explanation, FIG. 3 depicts even numbered bits conveyed in signal A and odd numbered bits conveyed in signal B. The two input data signals are retimed relative to a reference clock signal having a frequency (in cycles/second) that equals the bit rate (in bits/second) of the two input data signals. The SEL signal in FIG. 3 represents this reference clock signal.

One of the retimed data signals, e.g., signal B, is then delayed by a fixed delay amount to generate a delayed intermediate data signal (labeled signal C in FIG. 3). As shown in FIG. 3, signal C is also delayed relative to signal A. This delayed intermediate data signal serves as an input to one programmable delay element, while the other retimed data signal (i.e., signal A) serves as an input to another programmable delay element. Digital control signals for each programmable delay element are obtained, and the respective delay amounts for each delay element are determined in response to the control signals. The first retimed data signal and the delayed intermediate data signal are delayed by the programmable delay elements to obtain a first selectable data signal (labeled signal D0 in FIG. 3) and a second selectable data signal (labeled signal D1 in FIG. 3). Typically, the amount of delay introduced by the programmable delay elements is small relative to the bit period of the data signals. For example, in practical embodiments, the programmable delay is less than 15% of the bit period.

As described above, the reference clock signal is buffered to improve its waveform shape such that it can be used as a high speed multiplexer select control signal. The improvement in the waveform shape is not depicted in FIG. 3. In practical embodiments, the buffer amplifier introduces a slight delay to the reference clock signal. FIG. 3 illustrates the delay between the reference clock signal (i.e., the SEL signal) and the multiplexer control signal (labeled signal S in FIG. 3). The programmable delay elements compensate for the delay added to the reference clock signal, and reduce the jitter in the resulting multiplexer output signal. The multiplexer output represents the serialized data output, which is labeled as the OUT signal in FIG. 3.

FIG. 3 depicts a desirable alignment of the multiplexer select signal (i.e., signal S) and the two multiplexer input signals (i.e., the D0 and D1 signals). As shown in FIG. 3, the data conveyed in the D0 signal is utilized for the serialized output signal when the multiplexer select signal is low, and the data conveyed in the D1 signal is utilized for the serialized output signal when the multiplexer select signal is high. Notably, the respective bit states of the D0 and D1 signals are well settled whenever the multiplexer switches output states. In this manner, bit transitions in the D0 and D1 signals are not present in the serialized output signal. Ultimately, the serialized output signal has a data rate that is twice the data rate of the original input signals, and the serialized output data represents the bits from the first input signal interleaved with the bits from the second input signal. In this regard, FIG. 3 shows the even and odd data bits rearranged in numerical order, with the bit period of the serialized output signal being half the bit period of the A and B signals.

The present invention has been described above with reference to a preferred embodiment. However, those skilled in the art having read this disclosure will recognize that changes and modifications may be made to the preferred embodiment without departing from the scope of the present invention. These and other changes or modifications are intended to be included within the scope of the present invention, as expressed in the following claims.

What is claimed is:

1. A serializer circuit comprising:
   a first programmable delay element having a first input for a first input data signal, a first output, and at least one control input for a first number of control signals, said first programmable delay element being configured to generate, at said first output, a first delayed data signal representing said first input data signal delayed by a first delay amount determined by said first number of control signals;
   a second programmable delay element having a second input, for a second input data signal, a second output, and at least one control input for a second number of control signals, said second programmable delay element being configured to generate, at said second output, a second delayed data signal representing said second input data signal delayed by a second delay amount determined by said second number of control signals; and
   an output signal selector having a third input for a first selectable signal based on said first delayed data signal, a fourth input for a second selectable signal based on said second delayed data signal, and a third output, said output signal selector being configured to select, in response to a select signal having a frequency of F cycles/second, said first selectable signal or said second selectable signal for use as a serialized output signal at said third output; wherein
   said first input data signal and said second input data signal each convey data at a rate of F bits/second;
   said second input data signal is delayed relative to said first input data signal; and
   said serialized output signal conveys data at a rate of 2F bits/second.

2. A serializer circuit according to claim 1, wherein said first delay amount and said second delay amount respectively adjust timing of said first delayed data signal and said second delayed data signal, relative to said select signal.

3. A serializer circuit according to claim 1, wherein:
   for said first programmable delay element, said at least one control input comprises N control inputs and said first number of control signals comprises N digital control signals; and
   for said second programmable delay element, said at least one control input comprises M control inputs and said second number of control signals comprises M digital control signals.

4. A serializer circuit according to claim 1, wherein:
   said first output of said first programmable delay element is connected to said third input of said output signal selector;
   said first selectable signal corresponds to said first delayed data signal;

said second output of said second programmable delay element is connected to said fourth input of said output signal selector; and said second selectable signal corresponds to said second delayed data signal.

5. A serializer circuit according to claim 1, wherein said output signal selector is a multiplexer.

6. A serializer circuit according to claim 1, further comprising:

an input signal retimer configured to receive a first initial input data signal, a second initial input data signal, and a reference clock signal, and to synchronize said first and second initial input data signals relative to said reference clock signal, said input signal retimer generating a first aligned data signal from said first initial input data signal and a second aligned data signal from said second initial input data signal; and a fixed delay element having a fifth input for an intermediate data signal based on said second aligned data signal, and a fourth output for a delayed intermediate data signal representing said intermediate data signal delayed by a third delay amount; wherein said first input data signal is based on said first aligned data signal, and said second input data signal is based on said delayed intermediate data signal.

7. A serializer circuit according to claim 6, wherein:

said intermediate data signal corresponds to said second aligned data signal;

said first input data signal corresponds to said first aligned data signal; and said second input data signal corresponds to said delayed intermediate data signal.

8. A serializer circuit according to claim 6, wherein said input signal retimer comprises:

a first flip-flop circuit having a first data input for said first initial input data signal, a first clock input for said reference clock signal, and a first data output for said first aligned data signal; and a second flip-flop circuit having a second data input for said second initial input data signal, a second clock input for said reference clock signal, and a second data output for said second aligned data signal.

9. A serializer circuit according to claim 6, wherein said fixed delay element comprises a latch circuit having a data input for said intermediate data signal, a clock input for said reference clock signal, and a data output for said delayed intermediate data signal.

10. A serializer circuit according to claim 6, wherein said third delay amount is equal to $$\frac{1}{2F}$$

seconds.

11. A serializer circuit according to claim 6, further comprising a buffer element having a sixth input for said reference clock signal and a fifth output coupled to said output signal selector, said buffer element being configured to generate said select signal in response to said reference clock signal.

12. A serializer circuit according to claim 1, wherein:

said output signal selector is configured to select one of said first and second selectable signals when said select signal is in a logic high state, and to select the other one of said first and second selectable signals when said select signal is in a logic low state; and said first delay amount and said second delay amount respectively adjust timing of said first and second delayed data signals such that transitions of said select signal occur at times when the bit state of data in said first and second selectable signals is settled.

13. A method for serializing digital data, said method comprising:

delaying a first input data signal by a first programmable delay amount to generate a first delayed data signal;

delaying a second input data signal by a second programmable delay amount to generate a second delayed data signal; and selecting, in response to a select signal having a frequency of F cycles/second, said first delayed data signal or said second delayed data signal for use as a serialized output signal; wherein said first input data signal and said second input data signal each convey data at a rate of F bits/second;

said second input data signal is delayed relative to said first input data signal; and said serialized output signal conveys data at a rate of 2F bits/second.

14. A method according to claim 13, further comprising:

providing a first number of control signals to a first programmable delay element, said first number of control signals determining said first programmable delay amount; and providing a second number of control signals to a second programmable delay element, said second number of control signals determining said second programmable delay amount.

15. A method according to claim 13, further comprising:

receiving a first initial input data signal and a second initial input data signal, each conveying data at a rate of F bits/second;

retiming said first initial input data signal, in response to a reference clock signal having a frequency of F cycles/second, to generate said first input data signal;

retiming said second initial input data signal, in response to said reference clock signal, to generate an aligned data signal; and delaying said aligned data signal by a fixed delay amount to generate said second input data signal.

16. A method according to claim 15, wherein said fixed delay amount is equal to $$\frac{1}{2F}$$

seconds.

17. A method according to claim 13, wherein said selecting step comprises:

selecting one of said first and second delayed data signals when said select signal is in a logic high state; and selecting the other one of said first and second delayed data signals when said select signal is in a logic low state; wherein said first programmable delay amount and said second programmable delay amount respectively adjust timing of said first and second delayed data signals such that transitions of said select signal occur at times when the bit state of data in said first and second delayed data signals is settled.

18. A serializer circuit comprising:

a first flip-flop circuit configured to receive a first initial input data signal and a reference clock signal having a frequency of F cycles/second, and to retime said first initial input data signal, in response to said reference clock signal, into a first aligned data signal;

a second flip-flop circuit configured to receive a second initial input data signal and said reference clock signal, and to retime said second initial input data signal, in response to said reference clock signal, into a second aligned data signal;

a latch circuit configured to receive said second aligned data signal and said reference clock signal, and to delay said second aligned data signal by a fixed delay amount to generate a delayed intermediate data signal;

a first programmable delay element configured to receive said first aligned data signal and a first number of control signals, and to delay said first aligned data signal by a first delay amount determined by said first number of control signals to generate a first selectable signal;

a second programmable delay element configured to receive said delayed intermediate data signal and a second number of control signals, and to delay said delayed intermediate data signal by a second delay amount determined by said second number of control signals to generate a second selectable signal;

a buffer element configured to receive said reference clock signal and to generate a select signal in response to said reference clock signal, said select signal having a frequency of F cycles/second; and a multiplexer configured to receive said first and second selectable signals, and to select said first selectable signal or said second selectable signal for use as a serialized output signal in response to said select signal.

19. A serializer circuit according to claim 18, wherein said third delay amount is equal to $$\frac{1}{2F}$$

seconds.

20. A serializer circuit according to claim 18 wherein:

said multiplexer is configured to select one of said first and second selectable signals when said select signal is in a logic high state, and to select the other one of said first and second selectable signals when said select signal is in a logic low state; and said first delay amount and said second delay amount respectively adjust timing of said first and second selectable signals such that transitions of said select signal occur at times when the bit state of data in said first and second selectable signals is settled.

* * * * *